(12) United States Patent
Iwasaki et al.

(10) Patent No.: US 12,191,733 B2
(45) Date of Patent: Jan. 7, 2025

(54) MOTOR

(71) Applicant: Nidec Corporation, Kyoto (JP)

(72) Inventors: Shuji Iwasaki, Kyoto (JP); Toshiya Okamoto, Kyoto (JP); Takashi Hattori, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 293 days.

(21) Appl. No.: 17/950,151

(22) Filed: Sep. 22, 2022

(65) Prior Publication Data

US 2023/0102080 A1 Mar. 30, 2023

(30) Foreign Application Priority Data

Sep. 30, 2021 (JP) ................ 2021-162421

(51) Int. Cl.
| | |
|---|---|
| H02K 3/50 | (2006.01) |
| H02K 5/173 | (2006.01) |
| H02K 5/22 | (2006.01) |
| H02K 11/00 | (2016.01) |
| H02K 11/33 | (2016.01) |

(52) U.S. Cl.
CPC ............ *H02K 3/50* (2013.01); *H02K 5/1732* (2013.01); *H02K 5/225* (2013.01); *H02K 11/0094* (2013.01); *H02K 11/33* (2016.01); *H02K 2203/09* (2013.01)

(58) Field of Classification Search
CPC ............................ H02K 5/1732; H02K 5/225
See application file for complete search history.

(56) References Cited

U.S. PATENT DOCUMENTS

| 2017/0207685 A1 | 7/2017 | Ushio et al. | |
|---|---|---|---|
| 2019/0044406 A1 | 2/2019 | Yamamoto | |
| 2021/0044170 A1* | 2/2021 | Okamoto | H02K 3/50 |
| 2021/0143708 A1* | 5/2021 | Hattori | H02K 11/40 |
| 2023/0094248 A1* | 3/2023 | Iwasaki | H02K 5/225 310/74 |
| 2023/0098144 A1* | 3/2023 | Okamoto | H02K 5/225 310/119 |

(Continued)

FOREIGN PATENT DOCUMENTS

| JP | 2004-222354 A | 8/2004 |
|---|---|---|
| JP | 2012-070508 A | 4/2012 |

(Continued)

*Primary Examiner* — Robert W Horn
(74) *Attorney, Agent, or Firm* — Keating & Bennett, LLP

(57) ABSTRACT

A motor includes a rotor, a stator, a bearing, a motor housing, a bearing holder, a bus bar assembly, and a circuit board. The bearing holder includes a holder protrusion protruding radially outward of the motor housing. A bus bar cover is attached to the lower surface of the holder protrusion. The bus bar cover covers the terminal through hole axially penetrating the holder protrusion. The bus bar cover includes a cover portion and a flange portion. The cover portion covers the lower end portions of the bus bar terminal and the circuit terminal, and is tubular with an open upper surface. The flange portion extends outward from the upper end peripheral edge portion of the cover portion and is fixed to the lower surface of the holder protrusion. The flange portion includes an annular flange projection protruding upward from the upper surface.

8 Claims, 10 Drawing Sheets

(56) References Cited

U.S. PATENT DOCUMENTS

2023/0101842 A1\* 3/2023 Okamoto ............... H02K 7/085
 310/66
2023/0102080 A1\* 3/2023 Iwasaki .................. H02K 3/50
 310/71

FOREIGN PATENT DOCUMENTS

| JP | 2014-027773 A | | 2/2014 |
| JP | 2017-139830 A | | 8/2017 |
| JP | 2024070674 A | \* | 5/2024 |
| WO | 2016/046898 A1 | | 3/2016 |
| WO | WO-2023026610 A1 | \* | 3/2023 |

\* cited by examiner

MOTOR

CROSS-REFERENCE TO RELATED APPLICATIONS

The present application claims priority under 35 U.S.C. § 119 to Japanese Patent Application No. 2021-162421, filed on Sep. 30, 2021, the entire contents of which are hereby incorporated herein by reference.

1. FIELD OF THE INVENTION

The present disclosure relates to a motor.

2. BACKGROUND

A conventional motor includes a rotor, a stator, a bearing, a case (motor housing), a cover, and a substrate (circuit board). The rotor has a rotation shaft extending in the axial direction. The stator radially opposes the rotor. The bearing rotatably supports the rotation shaft. The case accommodates the stator. The cover has the opening of the case and a through hole (terminal through hole) that penetrates in the axial direction.

The lead wire (bus bar terminal) drawn out from the stator and the terminal (circuit terminal) connected to the substrate protrude outside of the cover through the through hole and are electrically connected. The connected lead wire and terminal are covered with a shielding member (bus bar cover). At this time, the shielding member is fixed to the cover by soldering.

However, in the conventional motor, there is a possibility that the soldered portion is deteriorated, and the sealing property between the shielding member and the cover is lowered, and there is a possibility that the waterproof property is lowered.

SUMMARY

A motor according to an example embodiment of the present disclosure includes a rotor, a stator, a bearing, a motor housing, a bearing holder, a bus bar assembly, and a circuit board. The rotor includes a shaft extending along an axis of rotation. The stator radially opposes the rotor. The bearing rotatably supports the shaft. The motor housing accommodates the stator and opens axially upward. The bearing holder holds the bearing and covers the opening of the motor housing. The bus bar assembly is electrically connected to the stator and located on the bearing holder. The circuit board is located axially above the bus bar assembly and is electrically connected to the bus bar assembly. The bearing holder includes a holder protrusion. The holder protrusion protrudes radially outward of the motor housing. A bus bar cover is attached to the lower surface of the holder protrusion. The bus bar cover covers the terminal through hole axially penetrating the holder protrusion. The bus bar assembly includes a bus bar, a bus bar terminal, and a bus bar holder. The bus bar is located around the bearing and is connected to the conductive wire drawn out from the stator. The bus bar terminal is connected to the bus bar, extends axially downward, passes through the terminal through hole, and protrudes axially downward from the lower surface of the holder protrusion. The bus bar holder covers the outer surfaces of the bus bar and the bus bar terminal, and includes an insulator. The circuit board includes a circuit terminal. The circuit terminal extends axially downward, passes through the terminal through hole, protrudes axially downward from the lower surface of the holder protrusion, and is connected to the bus bar terminal. The bus bar cover includes a cover portion and a flange portion. The cover portion covers the lower end portions of the bus bar terminal and the circuit terminal, and is tubular with an open upper surface. The flange portion extends outward from the upper end peripheral edge portion of the cover portion and is fixed to the lower surface of the holder protrusion. The flange portion includes an annular flange projection protruding axially upward from the upper surface. The holder protrusion includes an annular seal recess that is recessed axially upward from the lower surface and surrounds the terminal through hole. The flange projection is located inside the seal recess that includes the seal material.

The above and other elements, features, steps, characteristics and advantages of the present disclosure will become more apparent from the following detailed description of the example embodiments with reference to the attached drawings.

DETAILED DESCRIPTION

Figure 3:
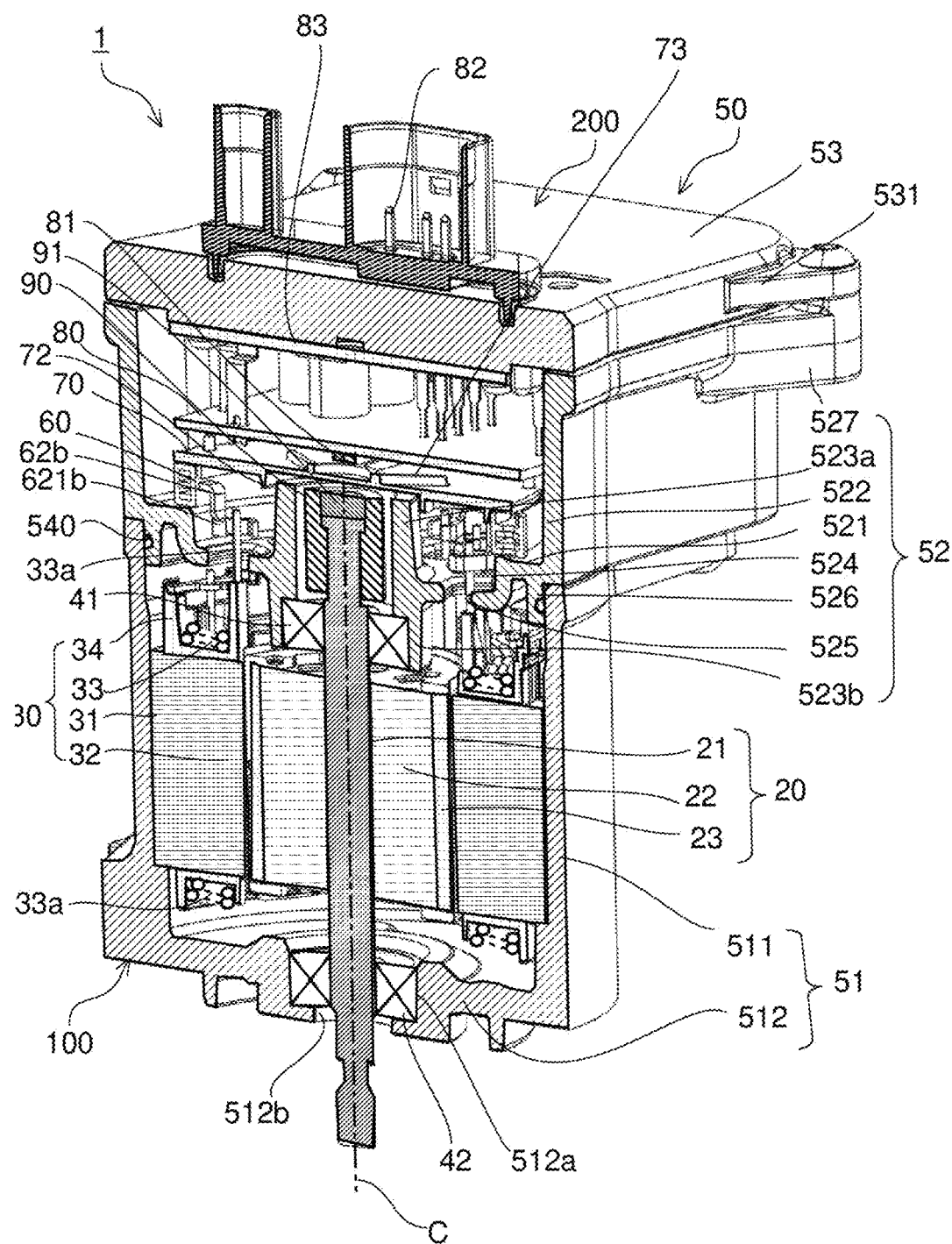
FIG. 3 is a perspective view of a vertical cross section of a motor according to an example embodiment of the present disclosure.

Hereinafter, example embodiments of the present disclosure will be described in detail with reference to the accompanying drawings. Note that a direction in which the center axis C of the motor 1 illustrated in FIG. 1 extends is simply referred to as an "axial direction", and a radial direction and a circumferential direction around the center axis C of the motor 1 are simply referred to as a "radial direction" and a "circumferential direction". Note that the "axial direction", the "radial direction", and the "circumferential direction" are names used merely for description, and do not limit the actual positional relationship or direction. In the present example embodiment, for convenience of description, the axial direction is defined as the vertical direction, and the vertical direction in FIG. 3 is defined as the vertical direction of the motor, and the shape and positional relationship of each part will be described. However, there is no intention to limit the direction at the time of manufacture and use of a motor 1 according to the disclosure by this definition of the vertical direction.

Figure 1:
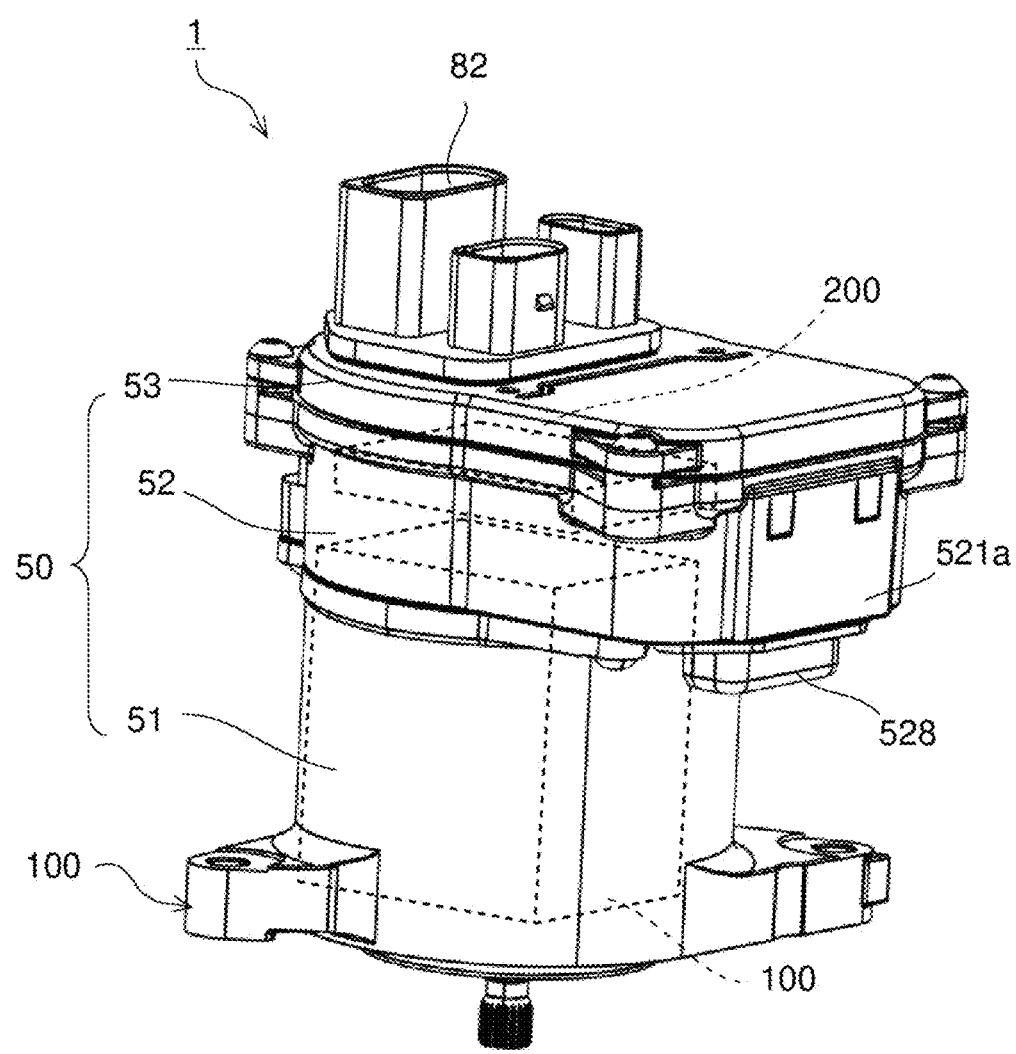
FIG. 1 is a perspective view of a motor of an example embodiment of the present disclosure.
Figure 2:
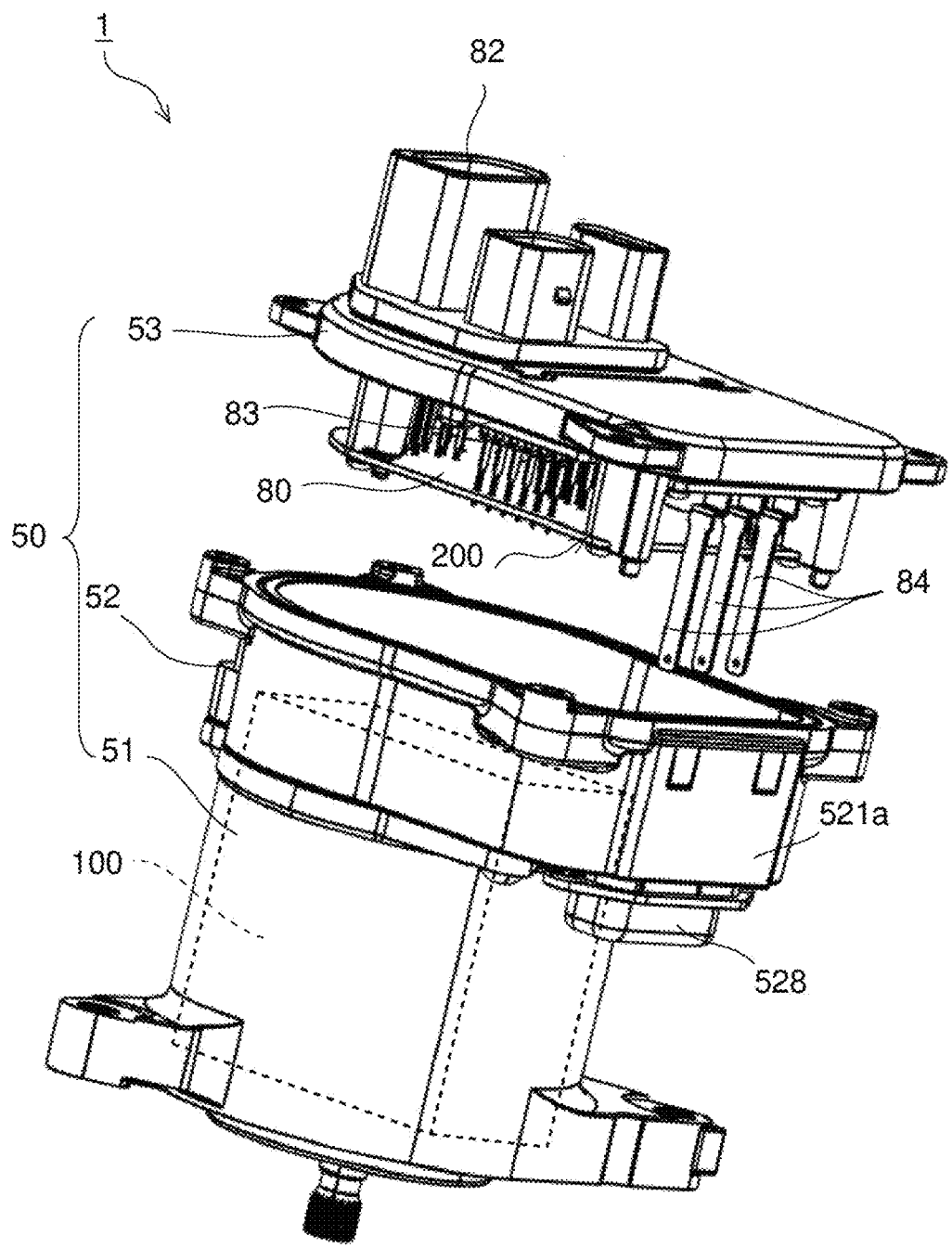
FIG. 2 is an exploded perspective view of a motor according to an example embodiment of the present disclosure.
Figure 4:
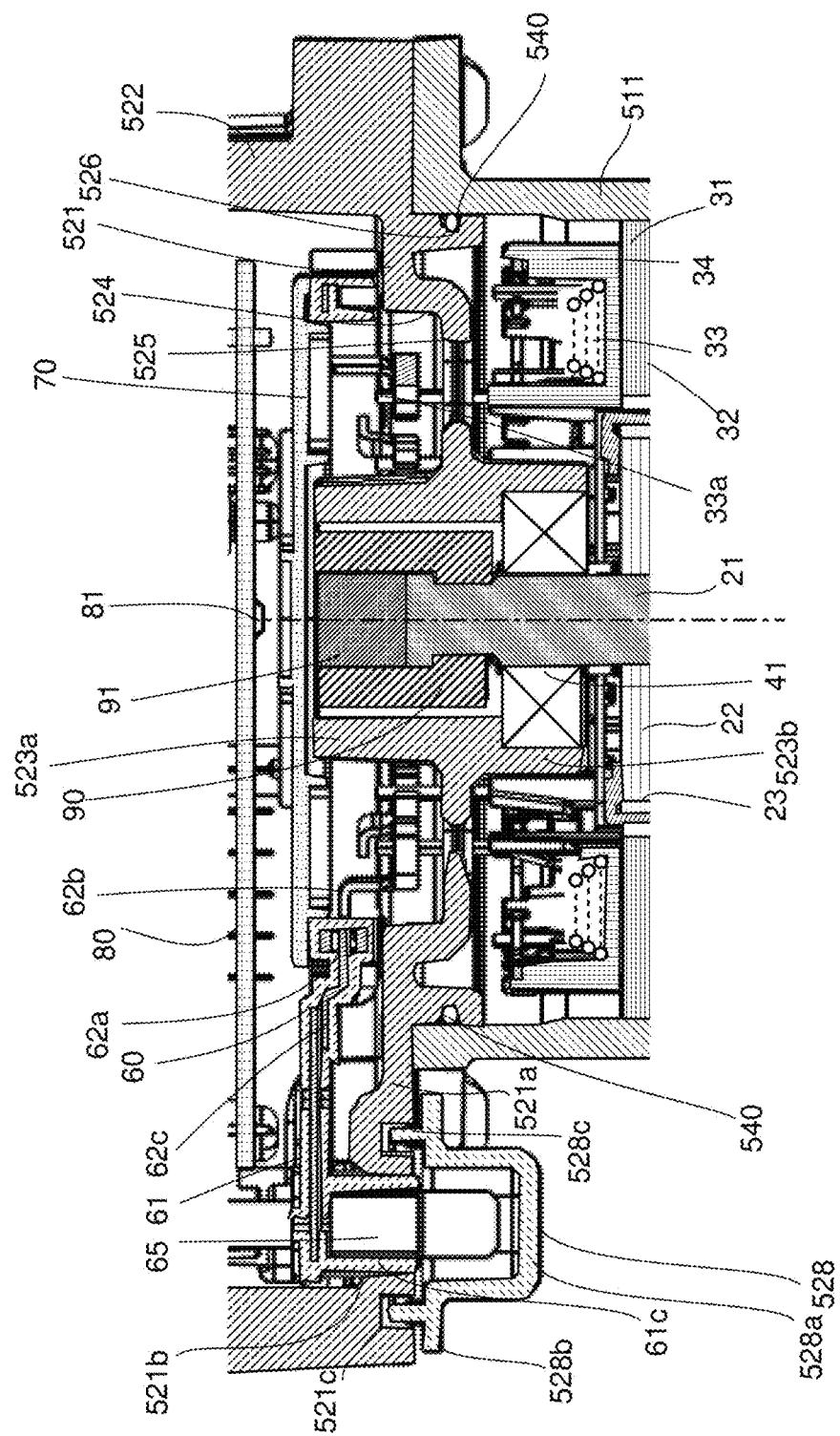
FIG. 4 is an enlarged longitudinal sectional view illustrating a portion of a motor according to an example embodiment of the present disclosure.
Figure 5:
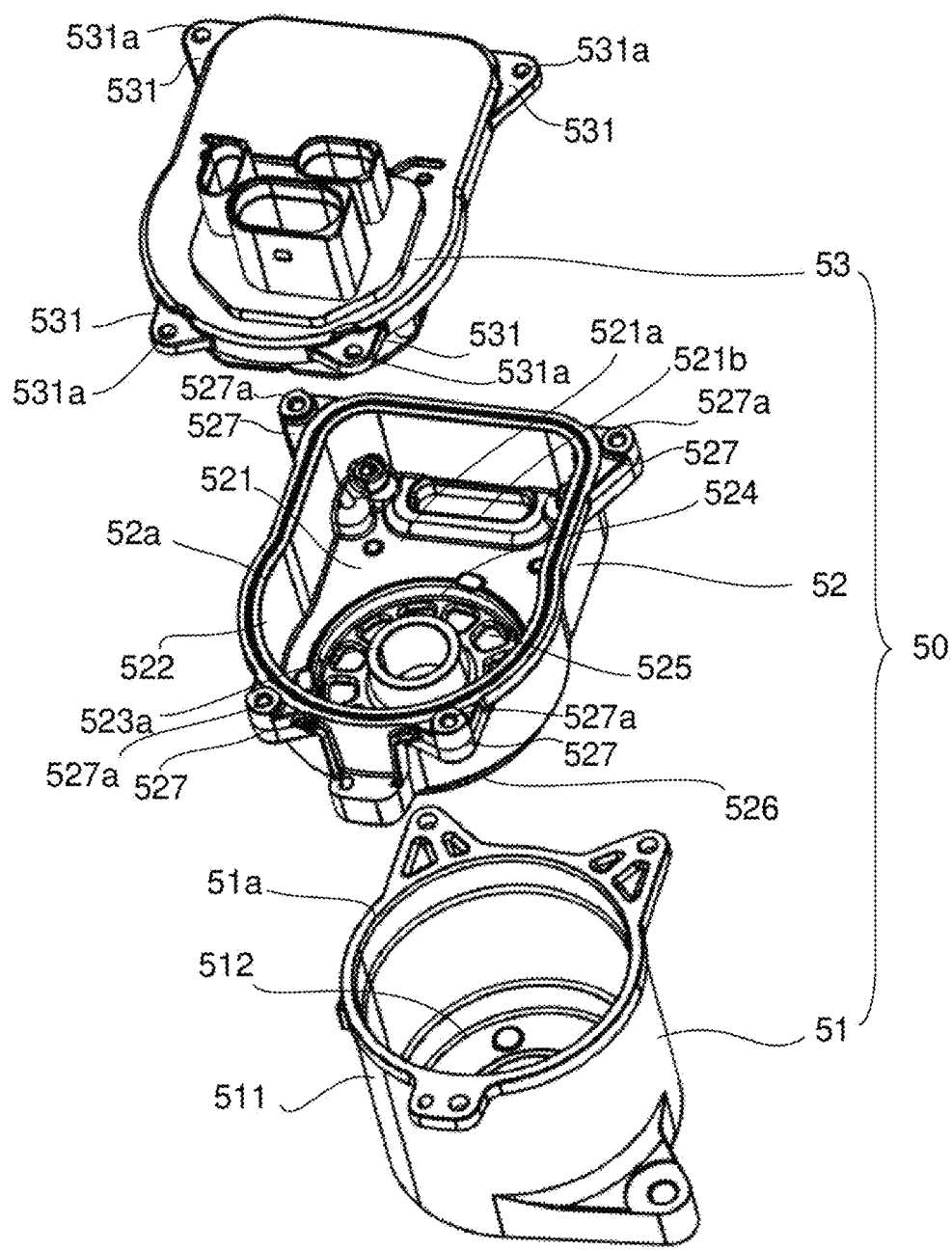
FIG. 5 is an exploded perspective view of a housing of a motor according to an example embodiment of the present disclosure.

A motor according to an example embodiment of the present disclosure will be described. FIGS. 1 and 2 are a perspective view and an exploded perspective view of a motor 1 according to an example embodiment of the present disclosure. FIG. 3 is a longitudinal cross-sectional view of the motor 1, and FIG. 4 is an enlarged longitudinal cross-sectional view of part of the motor 1. FIG. 5 is an exploded perspective view of a housing 50.

In the motor 1, the motor body 100 and the control unit 200 are accommodated and integrated in the housing 50. The motor body 100 includes a rotor 20, a stator 30, an upper bearing (bearing) 41, a lower bearing 42, a bearing holder 52, and a bus bar assembly 60.

The control unit 200 is located axially above the motor body 100 and controls the rotation of the rotor 20. The control unit 200 includes a first circuit board 80, a second circuit board (circuit board) 83, and a connector unit 82. The connector unit 82 is electrically connected to the first circuit board 80, and supplies a drive current from an external power source to the first circuit board 80 and the second circuit board 83.

The motor body 100 and the control unit 200 are electrically connected by connection between a circuit terminal 84 connected to the second circuit board (circuit board) 83 and the bus bar assembly 60. The connection structure between the circuit terminal 84 and the bus bar assembly 60 will be described in detail later.

The housing 50 accommodates the motor body 100 and the control unit 200, and includes a motor housing 51, a bearing holder 52, and a cover 53.

That is, the motor 1 includes the rotor 20, the stator 30, the upper bearing (bearing) 41, the motor housing 51, the bearing holder 52, the bus bar assembly 60, and the second circuit board (circuit board) 83.

The motor housing 51 is formed in a bottomed cylindrical shape, and accommodates the rotor 20 and the stator 30 therein. The motor housing 51 includes a side wall portion 511 and a bottom wall portion 512. The side wall portion 511 extends axially upward and is formed in a cylindrical shape. The upper surface of the side wall portion 511 is opened to form an opening 51a. The lower surface of the side wall portion 511 is covered with a plate-shaped bottom wall portion 512. The bottom wall portion 512 includes a lower bearing holding portion 512a. The lower bearing holding portion 512a is located on a center axis C, and has an upper surface recessed in the axial direction. The lower bearing 42 is accommodated and held in the lower bearing holding portion 512a. A bottom wall through hole 512b penetrating in the axial direction is formed in the bottom face of the lower bearing holding portion 512a.

The bearing holder 52 holds the upper bearing (bearing) 41 and covers the opening of the motor housing 51. The bearing holder 52 is located axially above the motor housing 51 and is formed in a bottomed cylindrical shape. The bearing holder 52 accommodates the bus bar assembly 60 and an upper bearing 41 therein. The bearing holder 52 includes an intermediate wall portion 521, a peripheral wall portion 522, an upper cylindrical portion 523a, a lower cylindrical portion 523b, a recess 524, a bearing holder through hole 525, an annular coupling portion 526, and a holder flange portion 527.

The intermediate wall portion 521 is formed in a plate shape and covers the opening 51a of the motor housing 51. The intermediate wall portion 521 has a holder protrusion 521a. That is, the bearing holder 52 has the holder protrusion 521a. The holder protrusion 521a protrudes radially outward of the motor housing 51. The holder protrusion 521a has an axially penetrating terminal through hole 521b. A bus bar cover 528 that covers the terminal through hole 521b is attached to the lower surface of the holder protrusion 521a.

The peripheral wall portion 522 extends axially upward from the peripheral edge of the intermediate wall portion 521 and is formed in a tubular shape. The upper surface of the peripheral wall portion 522 is opened to form a bearing holder opening 52a.

The upper cylindrical portion 523a surrounds the center axis C, extends axially upward from the upper surface of the intermediate wall portion 521, and is formed in a cylindrical shape. A magnet holding portion 90 and a sensor magnet 91 described later are located in the upper cylindrical portion 523a.

The lower cylindrical portion 523b surrounds the center axis C and extends axially downward from the lower surface of the intermediate wall portion 521 to be formed in a cylindrical shape. The lower cylindrical portion 523b accommodates and holds the upper bearing 41. The upper cylindrical portion 523a and the lower cylindrical portion 523b communicate with each other in the axial direction.

The recess 524 is located radially outside of the upper cylindrical portion 523a and the lower cylindrical portion 523b, and is recessed axially downward from the upper surface of the intermediate wall portion 521. The recess 524 is formed in an annular shape surrounding the upper cylindrical portion 523a and the lower cylindrical portion 523b in top view. The bearing holder through hole 525 penetrates the bottom face of the recess 524 in the axial direction. A plurality of the bearing holder through holes 525 is located in the circumferential direction. In the present example embodiment, 12 bearing holder through holes 525 are provided.

The annular coupling portion 526 protrudes axially downward from the lower surface of the intermediate wall portion 521 and is formed in an annular shape surrounding the recess 524. The annular coupling portion 526 is press-fitted into the inner face of the side wall portion 511 of the motor housing 51 with an O-ring 540 interposed on the outer peripheral surface thereof. As a result, the annular coupling portion 526 is fitted into the opening of the motor housing 51, and the bearing holder 52 and the motor housing 51 are fixed.

The holder flange portion 527 protrudes radially outward from the upper end portion of the peripheral wall portion 522. The four holder flange portions 527 are provided on the outer peripheral portion of the peripheral wall portion 522. The holder flange portion 527 has a holder screw hole 527a extending in the axial direction.

The cover 53 is formed in a plate shape and covers the bearing holder opening 52a. The cover 53 has a cover flange portion 531. The cover flange portion 531 protrudes radially outward from the outer peripheral portion of the cover 53. The four cover flange portions 531 are provided on the outer peripheral portion of the cover 53. The cover flange portion 531 has an axially penetrating cover hole 531a. By aligning and screwing the cover hole 531a and the holder screw hole 527a, the cover 53 and the bearing holder 52 are fixed.

The rotor 20 includes a shaft 21, a rotor core 22, and a rotor magnet 23. The shaft 21 forms a rotation axis extending along the center axis C and is formed in a columnar shape. That is, the rotor 20 has the shaft 21 extending along the rotation axis. The shaft 21 is rotatably supported by the upper bearing 41 and the lower bearing 42 about the axis.

The lower end portion of the shaft 21 protrudes outside of the motor housing 51 through the bottom wall through hole 512*b*. The upper end portion of the shaft 21 is located inside the upper cylindrical portion 523*a*.

The rotor core 22 is formed in a cylindrical shape, and the shaft 21 is fixed inside by press fitting. The rotor magnet 23 is provided on the radially outer surface of the rotor core 22, and a plurality of rotor magnets is located in the circumferential direction. The rotor core 22 and the rotor magnet 23 rotate integrally with the shaft 21.

The stator 30 is located radially outside of the rotor 20. That is, the stator 30 faces the rotor 20 in the radial direction. The stator 30 is formed in a tubular shape, and the rotor 20 is located inside the stator 30. The stator 30 includes a core back portion 31, a tooth portion 32, a coil portion 33, and an insulator 34.

The core back portion 31 has a cylindrical shape concentric with the shaft 21. The outer peripheral surface of the core back portion 31, that is, the outer peripheral surface of the stator 30, is fitted to the inner peripheral surface of the side wall portion 511 of the motor housing 51.

The tooth portion 32 extends radially inward from the inner peripheral surface of the core back portion 31. A plurality of the tooth portions 32 is provided and located at equal intervals in the circumferential direction of the inner peripheral surface of the core back portion 31. In the present example embodiment, 12 tooth portions 32 are provided.

The coil portion 33 is configured by winding a conductive wire 33*a* around the insulator 34. The insulator 34 is attached to each tooth portion 32. The end portion of the conductive wire 33*a* wound around each of the tooth portions 32 extends axially upward, penetrates each of the bearing holder through holes 525, and is connected to the second circuit board 83 via the bus bar assembly 60 located inside the bearing holder 52.

When a drive current is supplied to the coil portion 33, a magnetic field is generated, and the rotor 20 rotates by the magnetic field.

The sensor magnet 91 is an annular permanent magnet, and the N pole and the S pole are located on a surface facing the sensor 81. The sensor magnet 91 is fitted to the inner peripheral surface of the tubular magnet holding portion 90, and the magnet holding portion 90 is fitted to the upper end portion of the shaft 21.

In the present example embodiment, the sensor magnet 91 is fixed inside the magnet holding portion 90. As a result, the sensor magnet 91 is connected to the shaft 21 via the magnet holding portion 90 and is rotatably located together with the shaft 21. The magnet 91 may be directly fixed to the tip of the shaft 21 with an adhesive or the like.

The first circuit board 80 and the second circuit board (circuit board) 83 are accommodated in the bearing holder 52. The first circuit board 80 and the second circuit board (circuit board) 83 are located axially above the bus bar assembly 60.

The first circuit board 80 and the second circuit board 83 extend perpendicularly to the center axis C and are formed in a plate shape. The second circuit board 83 is located axially above the first circuit board 80 with a predetermined gap interposed therebetween. When viewed from the axial direction, the first circuit board 80 and the second circuit board 83 are located so as to overlap each other.

The lower surface of the first circuit board 80 and the upper surface of the upper cylindrical portion 523*a* of the bearing holder 52 axially face each other with a gap interposed therebetween. The first circuit board 80 and the second circuit board 83 are electrically connected by connection pins (not illustrated).

The motor cover 70 is located between the first circuit board 80 and the upper surface of the upper cylindrical portion 523*a*. The motor cover 70 is formed in a disk shape and is located axially above the bus bar assembly 60. Accordingly, it is possible to prevent dust from adhering to the bus bar assembly 60.

The circuit terminal 84 is connected to the lower surface of the second circuit board 83. The circuit terminal 84 extends axially downward, passes through the inside of the terminal through hole 521*b*, protrudes axially downward from the lower surface of the holder protrusion 521*a*, and is connected to a bus bar terminal 65 described later. Accordingly, the second circuit board 83 is electrically connected to the bus bar assembly 60. The first circuit board 80 and the second circuit board 83 output a motor drive signal to the stator 40 via the bus bar assembly 60.

The sensor 81 that detects a rotational position of the rotor 20 is mounted on the lower surface of the first circuit board 80. The sensor 81 is located axially above the sensor magnet 91. Therefore, the distance between the sensor 81 and the sensor magnet 91 is short, and the magnetoresistance element can be suitably used for the sensor 81.

The sensor 81 detects the magnetic flux of the sensor magnet 91 to detect the rotational position of the rotor 20. As a result, a motor drive signal corresponding to the rotational position of the rotor 20 is output, and the drive current supplied to the coil portion 33 is controlled. Therefore, the driving of the motor 1 can be controlled.

Figure 6:
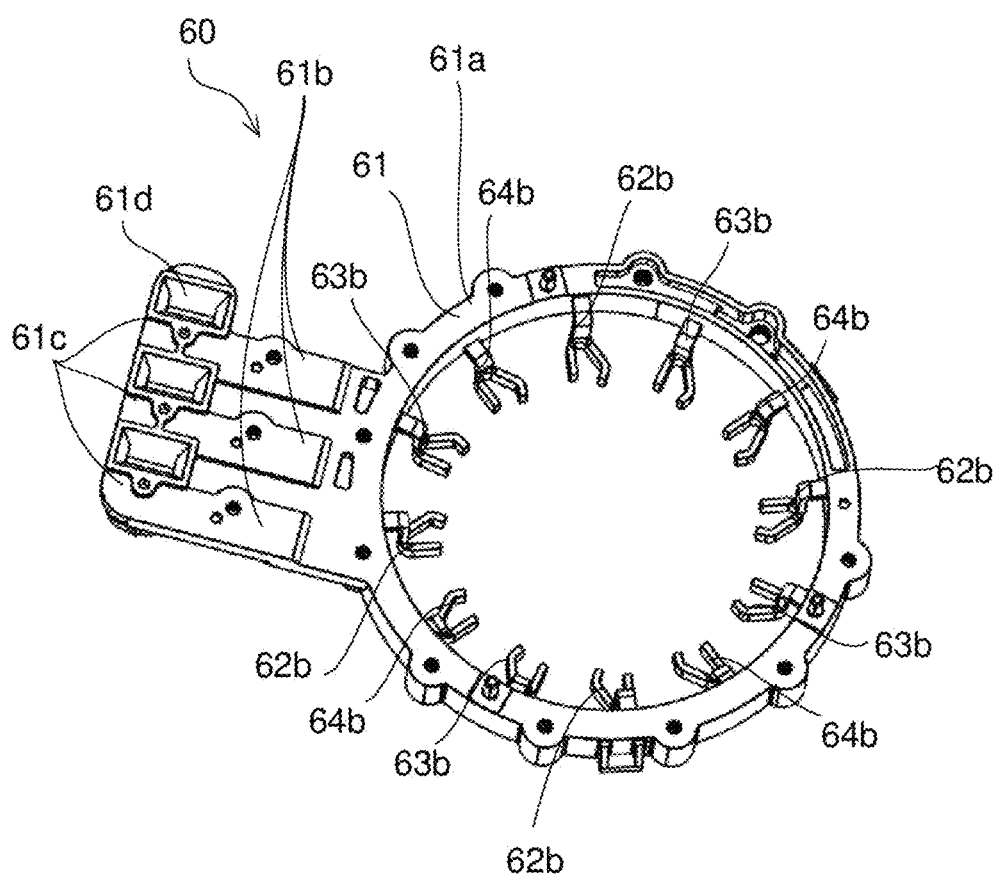
FIG. 6 is a perspective view of a bus bar assembly of a motor according to an example embodiment of the present disclosure.
Figure 7:
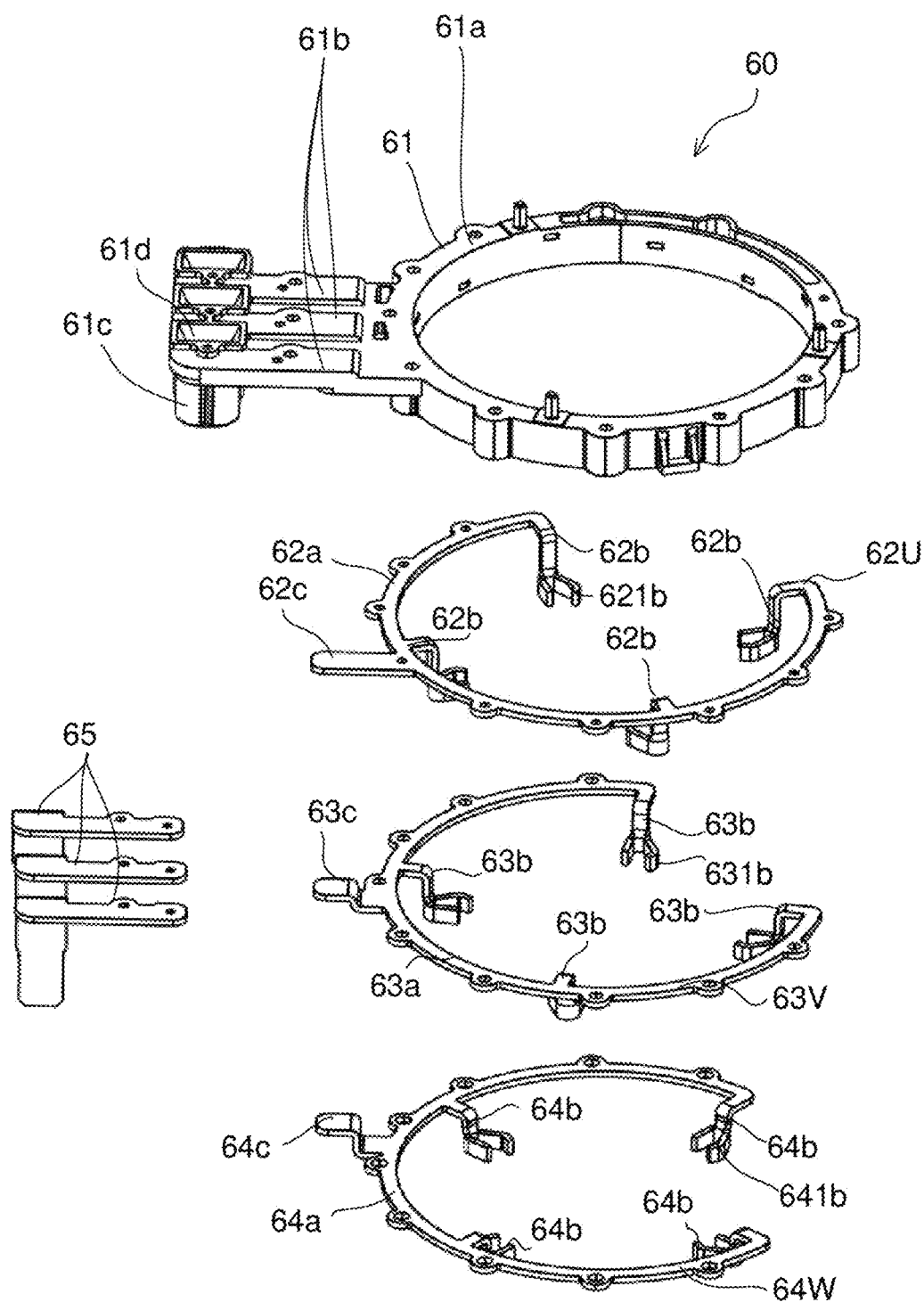
FIG. 7 is an exploded perspective view of a bus bar assembly of a motor according to an example embodiment of the present disclosure.

FIGS. 6 and 7 are a perspective view and an exploded perspective view of the bus bar assembly 60. The bus bar assembly 60 is electrically connected to the stator 30 and located on the bearing holder 52. The bus bar assembly 60 is located radially outside of the upper bearing 41 in the bearing holder 52.

The bus bar assembly 60 includes a bus bar holder 61, bus bars 62U, 63V, and 64W, and a bus bar terminal 65. The bus bars 62U, 63V, and 64W are formed of plate-like members having conductivity, and have shapes different from each other. The bus bars 62U, 63V, and 64W correspond to the U-phase, the V-phase, and the W-phase, respectively. In the present example embodiment, the bus bar 62U corresponds to the U-phase, the bus bar 63V corresponds to the V-phase, and the bus bar 64W corresponds to the W-phase.

The bus bar 62U includes a base portion 62*a*, a connection portion 62*b*, and a terminal portion 62*c*. The base portion 62*a* extends in the circumferential direction and is formed in an arc shape in top view.

The connection portion 62*b* protrudes radially inward from the radially inner face of the base portion 62*a*, and the distal end portion is bent axially downward. Four connection portions 62*b* are provided and located at equal intervals in the circumferential direction. The connection portion 62*b* has a conductive wire holding portion 621*b*. The conductive wire holding portion 621*b* protrudes radially inward from the distal end portion of the connection portion 62*b* and is formed in a substantially U shape in top view. The terminal portion 62*c* linearly extends radially outward from the radially outer surface of the base portion 62*a*.

The bus bar 63V includes a base portion 63*a*, a connection portion 63*b*, and a terminal portion 63*c*. The base portion 63*a* extends in the circumferential direction and is formed in an arc shape in top view.

The connection portion 63*b* protrudes radially inward from the radially inner face of the base portion 63*a*, and the distal end portion thereof is bent axially downward. The four connection portions 63b are provided and located in the circumferential direction at equal intervals. The connection portion 63b has a conductive wire holding portion 631b. The conductive wire holding portion 631b protrudes radially inward from the distal end portion of the connection portion 63b and is formed in a substantially U shape in top view. The terminal portion 63c protrudes axially upward from the radially outer surface of the base portion 63a, and the distal end portion thereof extends and is bent radially outward.

The bus bar 64W includes a base portion 64a, a connection portion 64b, and a terminal portion 64c. The base portion 64a extends in the circumferential direction and is formed in an arc shape in top view.

The connection portion 64b protrudes radially inward from the radially inner face of the base portion 64a, and the distal end portion thereof is bent axially downward. The four connection portions 64b are provided and located in the circumferential direction at equal intervals. The connection portion 64b has a conductive wire holding portion 641b. The conductive wire holding portion 641b protrudes radially inward from the distal end portion of the connection portion 64b and is formed in a substantially U shape in top view. The terminal portion 64c protrudes axially upward from the radially outer surface of the base portion 64a, and the distal end portion thereof extends and is bent radially outward.

The base portion 64a, the base portion 63a, and the base portion 62a are formed in a thin plate shape and sequentially overlap in the axial direction with a spacer (not illustrated) interposed therebetween. As a result, the bus bar assembly 60 can be thinned in the axial direction. The spacer is formed of, for example, a material having an insulating property such as resin.

In a state where the base portion 64a, the base portion 63a, and the base portion 62a overlap, the connection portion 62b, the connection portion 63b, and the connection portion 64b are located in order in the circumferential direction at equal intervals. At this time, the lower end of the connection portion 62b, the lower end of the connection portion 63b, and the lower end of the connection portion 64b are located at substantially the same axial height. In addition, the plurality of connection portions 62b, 63b, and 64b sequentially located in the circumferential direction at equal intervals protrudes radially inward from the radially inner faces of the base portions 62a, 63a, and 64a, respectively, and the bus bar assembly 60 can be downsized in the radial direction.

The conductive wire holding portions 621b, 631b, and 641b are electrically connected to the distal end portion of the conductive wire 33a extending axially upward from the stator 30 by laser welding or the like. That is, the connection portion 62b extends axially downward from the base portion 62a and is connected to the conductive wire 33a. The connection portion 63b extends axially downward from the base portion 63a and is connected to the conductive wire 33a. The connection portion 64b extends axially downward from the base portion 64a and is connected to the conductive wire 33a.

The bus bar terminal 65 is formed in an L shape, and one end side thereof extends in the radial direction. One end sides of the plurality of bus bar terminals 65 are connected and fixed to the terminal portion 62c, the terminal portion 63c, and the terminal portion 64c by welding. Thus, the bus bar terminals 65 are connected to the bus bars 62U, 63V, and 64W. The other end side of the bus bar terminal 65 extends axially downward and is electrically connected to the circuit terminal 84. The connection structure between the bus bar terminal 65 and the circuit terminal 84 will be described in detail later. In the present example embodiment, the bus bar terminal 65, the terminal portion 62c, the terminal portion 63c, and the terminal portion 64c are formed separately, but the present disclosure is not limited thereto. For example, the terminal portion 62c and the bus bar terminal 65, the terminal portion 63c and the bus bar terminal 65, and the terminal portion 64c and the bus bar terminal 65 may be integrally formed.

The bus bar holder 61 is made of an insulating material such as resin. The bus bar holder 61 covers the outer surfaces of the bus bars 62U, 63V, and 64W including the base portions 62a, 63a, and 64a, and the terminal portions 62c, 63c, and 64c, and the bus bar terminal 65. In the present example embodiment, the bus bars 62U, 63V, and 64W and the bus bar terminals 65 are embedded in and fixed to the bus bar holder 61 by insert molding. Thus, the bus bars 62U, 63V, and 64W are insulated from each other via the bus bar holder 61.

The bus bar holder 61 includes a base portion holder 61a, a terminal holder 61b, and a terminal guide portion 61c. The base portion holder 61a covers the base portions 62a, 63a, and 64a overlapping in the axial direction, and is formed in a substantially annular shape when viewed from the axial direction.

The terminal holder 61b linearly extends radially outward from the radially outer surface of the base portion holder 61a. The three terminal holders 61b are provided in the circumferential direction, and covers the terminal portions 62c, 63c, and 64c located side by side in the circumferential direction and one end, of the bus bar terminal 65, extending in the radial direction.

The terminal guide portion 61c is connected to the radially outer end of each terminal holder 61b. The terminal guide portion 61c extends in the axial direction and is formed in a tubular shape. The upper surface and the lower surface of the terminal guide portion 61c are opened. The terminal guide portion 61c covers the other end, of the bus bar terminal 65, extending in the axial direction. As a result, the bus bar terminals 65 connected to the U-phase, the V-phase, and the W-phase are insulated from each other via the terminal guide portion 61c.

Figure 8:
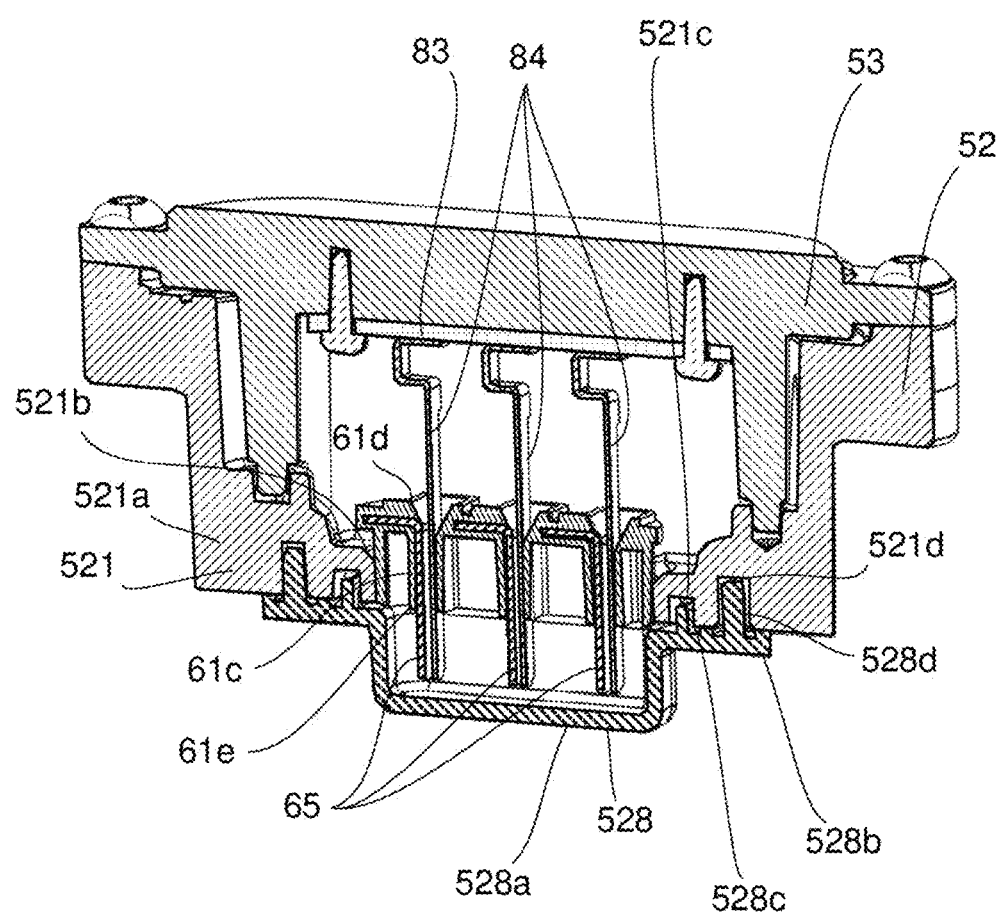
FIG. 8 is an enlarged longitudinal sectional view illustrating a portion of a motor according to an example embodiment of the present disclosure.

Each bus bar terminal 65 is partially exposed in the inside of the terminal guide portion 61c and is not covered by the terminal guide portion 61c (see FIG. 8).

The terminal guide portion 61c has an opening of a terminal insertion port 61d at an upper surface, and an opening of a terminal extraction port 61e at a lower surface (see FIG. 8).

Figure 9:
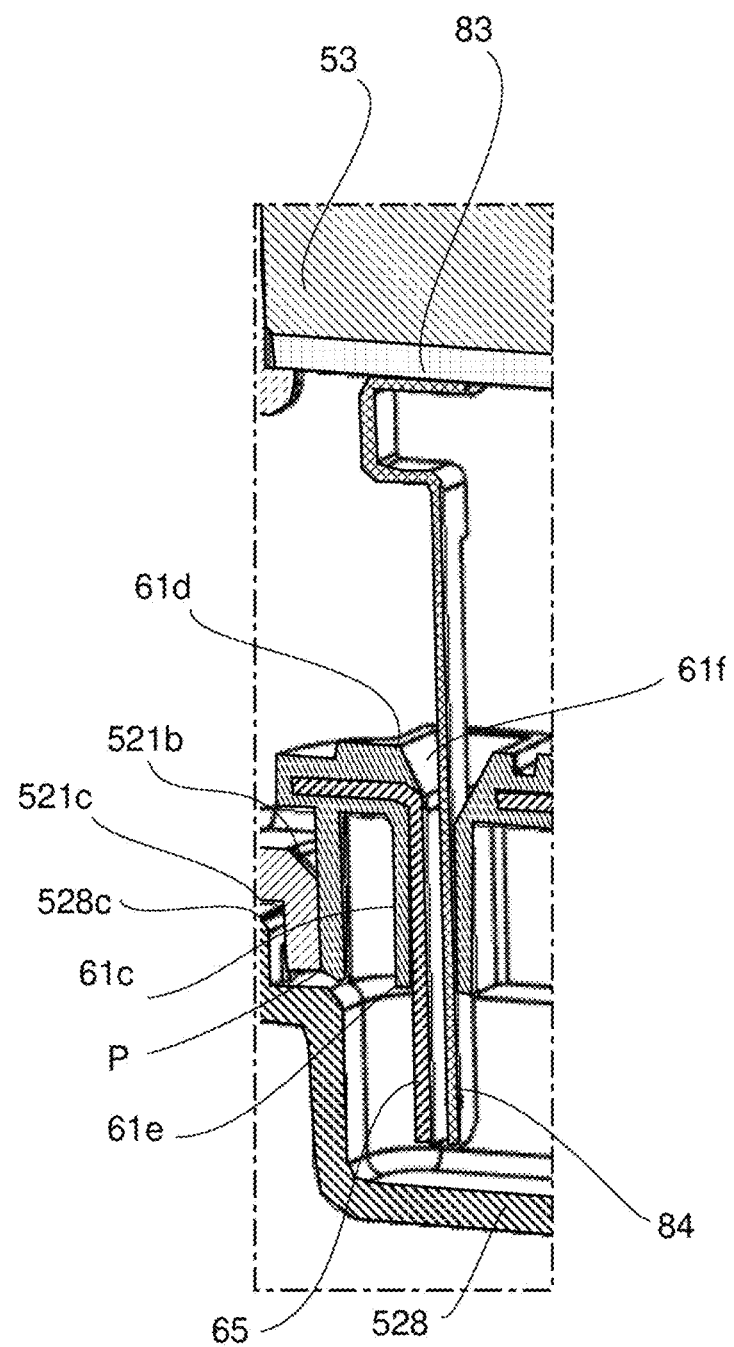
FIG. 9 is an enlarged longitudinal sectional view illustrating a portion of a motor according to an example embodiment of the present disclosure.

FIG. 8 is an enlarged cross-sectional perspective view illustrating the bus bar terminal 65 and the circuit terminal 84, and FIG. 9 is an enlarged cross-sectional perspective view illustrating the terminal guide portion 61c. The terminal guide portion 61c is located inside the terminal through hole 521b. The circuit terminal 84 is inserted into the terminal insertion port 61d and comes into contact with the bus bar terminal 65. Thus, the bus bar terminal 65 and the circuit terminal 84 are electrically connected in the terminal guide portion 61c.

The bus bar terminal 65 and the circuit terminal 84 pass through the terminal through hole 521b in a state of being accommodated in the terminal guide portion 61c. Therefore, the bus bar terminal 65 and the circuit terminal 84 are reliably insulated from the bearing holder 52, and the occurrence of a short circuit can be prevented.

The bus bar terminal 65 and the circuit terminal 84 protrude axially downward from the terminal extraction port

61e, and the lower end portions of the bus bar terminal 65 and the circuit terminal 84 are reliably connected by welding. At this time, the lower ends of the bus bar terminal 65 and the circuit terminal 84 are located axially below the lower surface of the bearing holder 52. As a result, it is possible to improve work efficiency at the time of welding in a state where the bus bar cover 528 is removed.

The lower end P of the terminal guide portion 61c is located axially below the lower end P of the terminal through hole 521b. As a result, the circuit terminal 84 and the bus bar terminal 65 can further prevent the occurrence of a short circuit by securing an insulation distance from the bearing holder 52.

The terminal guide portion 61c has an inclined portion 61f. The inclined portion 61f of the inner peripheral surface of the terminal guide portion 61c is inclined inward as going axially downward from the terminal insertion port 61d. As a result, the circuit terminal 84 can be smoothly guided from the terminal extraction port 61e to the inside of the terminal guide portion 61c along the inclined portion 61f. Therefore, work efficiency of assembling the motor 1 and the second circuit board 83 is improved. In addition, by making the terminal insertion port 61d large, even when the lower end portion of the circuit terminal 84 is shifted in the radial direction or the circumferential direction at the time of insertion, it is possible to reliably guide the circuit terminal into the terminal guide portion 61c.

Figure 10:
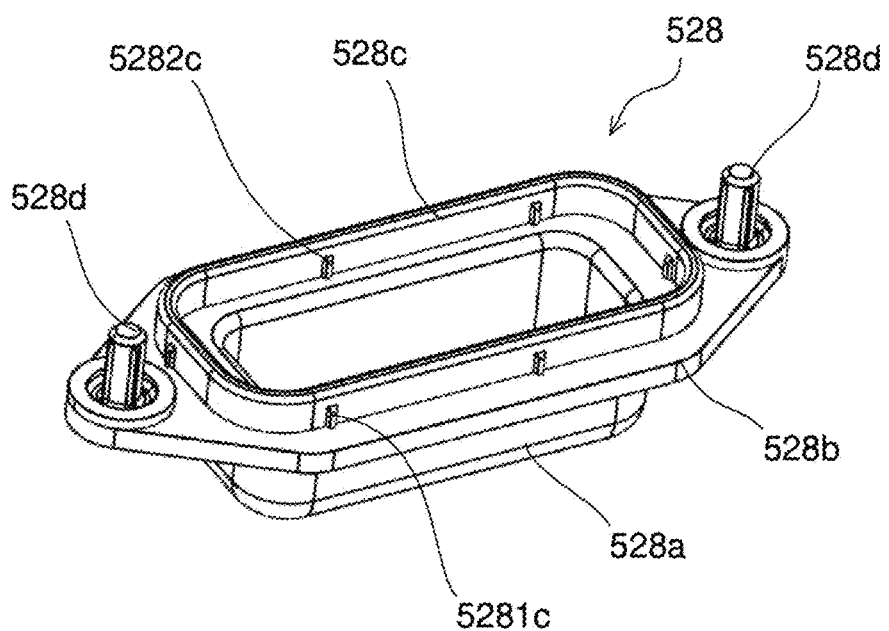
FIG. 10 is a perspective view of a bus bar cover according to an example embodiment of the present disclosure.

FIG. 10 is a perspective view of the bus bar cover 528. The bus bar cover 528 is, for example, a resin molded article. The bus bar cover 528 is attached after the lower end portions of the circuit terminal 84 and the bus bar terminal 65 are welded. Accordingly, it is possible to prevent the welded lower end portions of the circuit terminal 84 and the bus bar terminal 65 from being exposed to the outside of the bearing holder 52.

The bus bar cover 528 includes a tubular cover portion 528a and a flange portion 528b. The cover portion 528a covers the lower end portions of the bus bar terminal 65 and the circuit terminal 84, and has an open upper surface. The flange portion 528b extends outward from the upper end peripheral edge portion of the cover portion 528a and is fixed to the lower surface of the holder protrusion 521a.

The flange portion 528b includes a flange projection 528c and a pair of fixing pins 528d. The flange projection 528c protrudes axially upward from the upper surface of the flange portion 528b, and is formed in an annular shape surrounding the opening of the cover portion 528a.

The flange projection 528c includes a plurality of outer protrusions 5281c and a plurality of inner protrusions 5282c. The outer protrusion 5281c protrudes outward from the outer peripheral surface of the flange projection. The inner protrusion 5282c protrudes inward from the inner peripheral surface of the flange projection.

The pair of fixing pins 528d protrudes axially upward from the upper surface of the flange portion 528b, and is located with the flange projection 528c interposed therebetween.

The holder protrusion 521a includes a seal recess 521c and a fixing recess 521d (see FIG. 8). The fixing recess 521d is recessed axially upward from the lower surface, and the fixing pins 528d are located inside. By press-fitting the fixing pins 528d into the fixing recess 521d, the bus bar cover 528 can be easily fixed to the lower surface of the holder protrusion 521a. Therefore, work efficiency of assembling the motor 1 is improved.

The holder protrusion 521a is made of metal, and the bus bar cover 528 is made of resin. Therefore, the fixing pin 528d is hardly deteriorated by rust or the like, and the bus bar cover 528 can be fixed to the lower surface of the holder protrusion 521a. In addition, the resin has a thermal expansion coefficient larger than that of metal. Therefore, even when the motor 1 has a high temperature, it is possible to maintain a state in which the fixing pin 528d is fixed in the fixing recess 521d.

The seal recess 521c is recessed axially upward from the lower surface of the holder protrusion 521a and is formed in an annular shape surrounding the terminal through hole 521b. The flange projection 528c is located inside the seal recess 521c filled with the seal material. As a result, the sealability between the upper surface of the flange portion 528b and the lower surface of the holder protrusion 521a is improved. Therefore, the waterproof property can be improved.

In addition, for example, when the fixing pin 528d is broken, there is a possibility that the walls of the bus bar cover 528 and the bearing holder 52 filled with the seal material come into contact with each other and there is no gap therebetween. At this time, a portion where the seal material cannot be interposed is formed. However, since the outer protrusion 5281c and the inner protrusion 5282c are formed, even if the bus bar cover 528 comes into contact with the bearing holder 52, the contact is a line contact and a gap is formed. Therefore, the seal material can be interposed, and it is possible to suppress a decrease in sealability between the upper surface of the flange portion 528b and the lower surface of the holder protrusion 521a.

The lower end 61e of the terminal guide portion 61c is located axially below the lower end P of the terminal through hole 521b. Therefore, coming from the seal recess 521c is blocked by the terminal guide portion 61c, and it is possible to prevent the seal material adhering to the lower end portions of the bus bar terminal 65 and the circuit terminal 84.

In the present example embodiment, the seal material is an adhesive, and the bus bar cover 528 is fixed to the peripheral wall portion 522 of the bus bar holder 52 together with the sealing function. In addition, in a case where an adhesive is used, it takes time for the adhesive to be reliably fixed, and thus the fixing pins 528d are press-fitted into the fixing recess 521d to function as a temporary fixing. With such a configuration, a state where the bus bar cover 528 is positioned with respect to a bus bar holder 52 can be maintained. Further, a plurality of crush ribs extending in the axial direction is formed on the outer periphery of the fixing pins 528.

The example embodiments described above are merely examples of the present disclosure. The configuration of the example embodiments may be appropriately changed without departing from the technical idea of the present disclosure. In addition, the example embodiment and the plurality of modifications may be may be implemented in combination within a feasible range. In the present example embodiment, the plurality of outer protrusions 5281c and the plurality of inner protrusions 5282c are provided, but one of them may be omitted. Further, only one outer protrusion 5281c or only one inner protrusion 5282c may be provided.

The motor of the present disclosure can be used for an electric power steering device used for assisting steering wheel operation of a vehicle such as an automobile. The present disclosure is suitable for, for example, a power steering device, but can also be used for other devices such as a blower.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor comprising:
a rotor including a shaft extending along a rotation axis;
a stator radially opposing the rotor;
a bearing that rotatably supports the shaft;
a motor housing that accommodates the stator and that opens axially upward;
a bearing holder that holds the bearing and that covers an opening of the motor housing;
a bus bar assembly electrically connected to the stator and located on the bearing holder; and
a circuit board located axially above the bus bar assembly and electrically connected to the bus bar assembly; wherein
the bearing holder includes a holder protrusion protruding radially outward of the motor housing;
a bus bar cover that covers a terminal through hole axially penetrating the holder protrusion is attached to a lower surface of the holder protrusion;
the bus bar assembly includes:
a bus bar located around the bearing and connected to a conductive wire drawn out from the stator;
a bus bar terminal connected to the bus bar, extending axially downward, passing through the terminal through hole, and protruding axially downward from a lower surface of the holder protrusion; and
a bus bar holder that covers outer surfaces of the bus bar and the bus bar terminal and includes an insulator;
the circuit board includes a circuit terminal extending axially downward, passing through the terminal through hole, protruding axially downward from a lower surface of the holder protrusion, and connected to the bus bar terminal;
the bus bar cover includes:
a tubular cover portion that covers lower end portions of the bus bar terminal and the circuit terminal and that includes an open upper surface; and
a flange portion extending outward from an upper end peripheral edge portion of the cover portion and fixed to a lower surface of the holder protrusion;
the flange portion includes an annular flange projection protruding axially upward from an upper surface;
the holder protrusion includes an annular seal recess that is recessed axially upward from a lower surface and that surrounds the terminal through hole; and
the flange projection is located inside the seal recess including a seal material.

2. The motor according to claim 1, wherein the flange projection includes an outer protrusion protruding outward from an outer peripheral surface.

3. The motor according to claim 2, wherein the outer protrusion includes a plurality of the outer protrusions.

4. The motor according to claim 1, wherein the flange projection includes an inner protrusion protruding inward from an inner peripheral surface.

5. The motor according to claim 4, wherein the inner protrusion includes a plurality of the inner protrusions.

6. The motor according to claim 1, wherein
the flange portion includes a pair of fixing pins protruding axially upward from an upper surface and located with the flange projection interposed therebetween; and
the holder protrusion includes a fixing recess that is recessed axially upward from a lower surface and in which the fixing pin is located.

7. The motor according to claim 1, wherein the holder protrusion is made of metal, and the bus bar cover is made of resin.

8. The motor according to claim 1, wherein
the bus bar holder includes a tubular terminal guide portion extending in the axial direction, located in the terminal through hole, and accommodating the bus bar side connection terminal and the circuit connection terminal therein; and
a lower end of the terminal guide portion is located axially below a lower end of the terminal through hole.

* * * * *